April 19, 1960  H. PH. G. A. R. VON ZBOROWSKI  2,933,266
ANNULAR WING FLYING MACHINES
Filed Feb. 7, 1956  3 Sheets-Sheet 1

INVENTOR
HELMUT PH. G.A.R. VON ZBOROWSKI
BY
Bailey Stephens and Huettig
ATTORNEYS INVENTOR
HELMUT PH. G.A.R. VON ZBOROWSKI
BY
Bailey Stephens & Huettig
ATTORNEYS April 19, 1960 H. PH. G. A. R. VON ZBOROWSKI 2,933,266
ANNULAR WING FLYING MACHINES
Filed Feb. 7, 1956 3 Sheets-Sheet 3

INVENTOR
HELMUT PH. G.A.R. VON ZBOROWSKI
BY
Bailey, Stephens & Huettig
ATTORNEYS

2,933,266
ANNULAR WING FLYING MACHINES

Helmut Ph. G. A. R. von Zborowski, Chateau de Boussy St. Antoine par Brunoy, France Application February 7, 1956, Serial No. 563,989

Claims priority, application France January 18, 1951

3 Claims. (Cl. 244—12)

The invention relates to flying machines and methods of operating the same, and more particularly to such machines having substantially annular lift-producing surfaces forming the whole aerodynamic supporting part of the machine.

The primary object of the invention is to provide a machine which operates more easily than conventional machines.

Another object of the invention is to provide a machine which is inexpensive in construction and can be built more cheaply than ordinary flying machines of equal performance.

A further object of the invention is to provide a flying machine capable of travelling at high speeds, including supersonic speeds.

The invention in general contemplates the provision of an annular wing structure of air-foil longitudinal section, symmetrical about two planes at right angles to each other and intersecting each other along its longitudinal axis, this annular wing structure comprising substantially the whole lift-producing surface of the machine, in combination with a ram-jet power plant exerting a propelling thrust along the axis of the annular wing structure, the annular wing forming the casing of the ram-jet. The machine is capable of flying in level flight, since it is provided with aerodynamic control members capable of maintaining it at a positive angle of incidence with respect to its trajectory, and with a power plant of sufficient power to drive it at sufficient speed at such positive angle of incidence as to produce a lift at least equal to the weight of the machine.

In preferred forms of the machine according to my invention, I locate the aerodynamic control surfaces which maintain the annular wing at a positive angle of incidence to its trajectory in front of the trailing edge of the wing. Spoilers are particularly appropriate as such control surfaces.

This application is a continuation in part of my prior applications S.N. 266,696, filed January 16, 1952 and S.N. 325,074, filed December 10, 1952, both now abandoned.

Further objects and advantages of the invention will appear more fully from the following description, especially when taken in conjunction with the accompanying drawings which form a part thereof.

Figure 1:
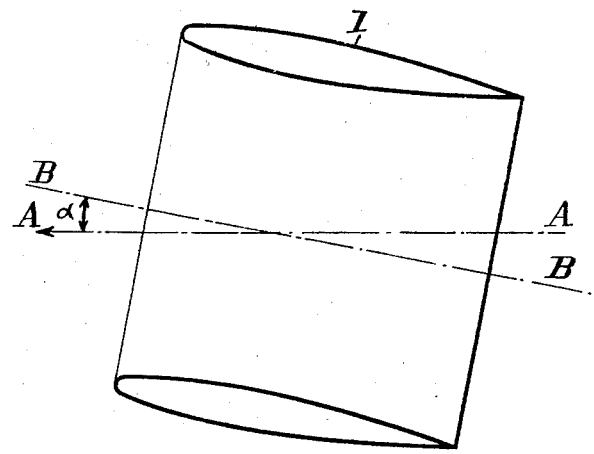
Figure 1 is a diagram explanatory of the invention.

Figure 1 shows schematically the operation of a flying machine according to my invention. The machine, which includes an annular wing, is flying in a horizontal straight line A—A in the direction indicated by the arrow. The thrust of the power plant is exerted along the longitudinal axis B—B of the wing (defined as the intersection of two planes at right angles to each other and about each of which said wing is symmetrical), and the controls are operated in such a way as to maintain the axis B—B at a positive angle of incidence $\alpha$ (which may, for example, be between 3° and 10°) to the trajectory A—A. The power plant has sufficient thrust to cause the wing, under these conditions, to exert a lift at least equal to the weight of the machine (including, of course, the load). In this way, the machine may fly in a level path.

Preferably, this system is wholly symmetric with respect to the axis, which facilitates manoeuvres such as sudden turns and steep climbs.

Preferably, wing 1 is given an asymmetrical airfoil profile and its diameter and chord are so chosen that the ratio of its diameter to its chord is relatively low, whereby the machine is of reduced width.

Figure 2:
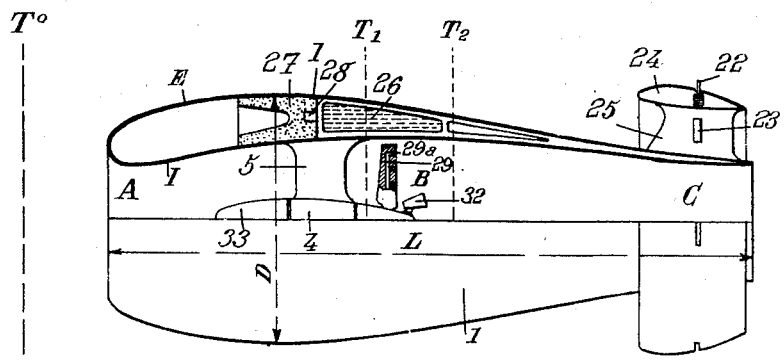
Figure 2 shows, partly in longitudinal section, a machine embodying the invention.
Figure 3:
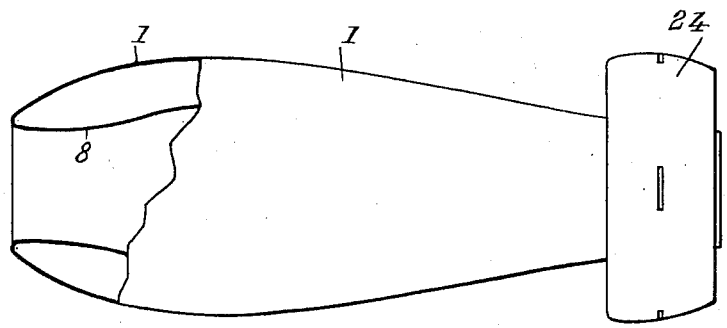
Figure 3 is a side view of a modification.

Figures 2 and 3 show constructions according to my invention in which the air duct of a ram-jet power plant also constitutes the annular wing 1 of the flying machine.

As shown by Figure 2, the inner wall I of annular wing 1 is given the proper shape to achieve the best possible operation of the ram-jet engine, this wall I including for instance a slightly divergent intake portion A starting from the leading edge of the wing, a combustion zone B and a discharge nozzle C, for instance slightly convergent.

The outer wall E of annular wing 1, which is connected by the leading edge to the inner wall, is shaped to achieve the desired aerodynamic properties, the determination of this outer wall being of course conditioned by the shape already determined for inner wall I. Advantageously, the wing section is established to make it possible to house various loads or parts of the aircraft therein.

In order to make allowance for the considerable differences of temperature (and therefore of expansion) between the inner and outer walls I and E, these walls are mounted for radial displacement with respect to each other, being securely assembled together at the front.

I will give some explanation concerning the advantages of such a construction.

If $T_0$ is the temperature of atmospheric air ahead of the leading edge of wing 1 (Figure 2), $T_1$ the temperature of the air inside annular wing 1 immediately ahead of the combustion zone ($T_1$ being only slightly different from $T_0$) and $T_2$ the temperature immediately downstream of this zone, the specific consumption of the aircraft (i.e. consumption per kg. of thrust per second) and the thrust coefficient thereof are both substantially proportional to the factor:

$$\left(\frac{T_2}{T_0} - 1\right)$$

so that a low value of the specific fuel consumption necessitates a low value of $$\frac{T_2}{T_0}$$

which corresponds to a low value of the thrust coefficient.

And the thrust coefficient necessary for a given performance of a flying machine is the lower as the drag of said machine is lower.

Now, in a flying machine according to my invention, the only drag practically to be taken into account is that of the ram-jet air duct, because this duct also constitutes the wing, whereas in a conventional aircraft the total drag is the sum of the drag of the wing, of the fuselage and of the ram-jet duct. Therefore a machine according to my invention requires a lower thrust coefficient and, consequently, a lower value of $$\frac{T_2}{T_0}$$

For instance, with the construction according to my invention, as illustrated by Figure 2, ratio $$\frac{T_2}{T_0}$$

may have a value equal to, and even lower than, 2, whereas, in the case of conventional aircrafts, its value ranges from 4 to 5.

The advantage resulting from this possibility of reducing the value of ratio $$\frac{T_2}{T_0}$$

i.e. of the specific fuel consumption, is obvious

But the importance of this advantage is better shown by numeric values. Since, as above stated, I can achieve level flight of the machine according to the present invention with values of $$\frac{T_2}{T_0}$$

lower than 2, for instance equal to 1.75, the above mentioned factor $$\left(\frac{T_2}{T_0}-1\right)$$

which is substantially proportional to the fuel specific consumption, may be equal to 0.75. In a conventional aircraft, where $$\frac{T_2}{T_0}$$

is equal for instance to 4, the corresponding factor is equal to 3. Therefore the respective specific fuel consumptions are in the ratio of 0.75 to 3, which means that the specific fuel consumption of a flying machine according to my invention will be only one fourth of that of a corresponding conventional aircraft.

On the other hand, owing to the aspect ratio of the wing (or, which is the same thing) of the ram-jet duct of a flying machine according to my invention (i.e. the ratio $$\frac{D}{L}$$

of its maximum outer diameter D to its chord L), which can be chosen lower than 1, for instance as low as 0.35, the machine has exceptional flying qualities such as the possibility of flying at very great angles of incidence and, in view of its low wing loading, it can move with transverse accelerations as high as, and even much higher than, 5 g.

For the same reason, my aircraft can be controlled by means of control surfaces of relatively low drag, for instance two sets of spoilers 22 and 23 operated from a distance by means of suitable signals. For instance there are four spoilers 22 disposed at the periphery of a tail surface 24, which is a body of revolution about the longitudinal axis of the wing and is of airfoil cross-section, whereas spoilers 23 are mounted in streamlined arms 25 supporting said tail surface 24 with respect to wing 1 and can be moved each on either side of the corresponding arm.

Wing 1 is preferably made hollow so as to be able to house some of the loads to be carried by the aircraft, for instance a fuel tank 26 and an explosive charge 27.

Of course, the wing section is determined in accordance with the speed of the aircraft. In particular, the section illustrated by Figure 2 is for an aircraft intended to fly at subsonic speeds, whereas the section shown by Figure 3 is for a supersonic aircraft.

Advantageously, the explosive charge is in the form of an annular charge 27 the front portion of which is provided with a groove running along its periphery and turned forwardly, the section of this groove being in the form of the axial section of the usual cavity provided in hollow charges. This explosive charge is ignited, upon impact on a target, by percussion fuzes 28.

The feed of fuel to the central duct of the ram-jet device is achieved, in the example shown by the drawing, by means of a freely rotatable airscrew or windmill 29 carried by a central streamlined body 4 coaxial with wing 1 and connected therewith through streamlined arms 5 inside which extend fuel conduits from tank 26. This windmill 29, which is rotated by the air stream flowing through the ram-jet air duct, is provided with a conduit, in communication with the above mentioned fuel conduits, which opens into said air duct through jets such as 29a for atomizing and distributing the fuel into the air stream flowing through said air duct. Ignition is obtained through suitable means, such as a spark plug 32.

The above mentioned aircraft is intended, in particular, to be used as a guided missile. For this purpose, for instance, it is first guided, through suitable means, such as guiding beams, to a relatively small distance from the target, after which it is guided, from a remote control station, in accordance with the indications of a suitable television head 33 mounted, for instance, at the front end of the central streamlined body 4.

By suitably adjusting spoilers 22, the device may be held at a substantial positive angle of incidence, sufficient to enable it to fly in level flight. Spoilers 23 may aid in such control and also help to control rolling movements.

Figure 4:
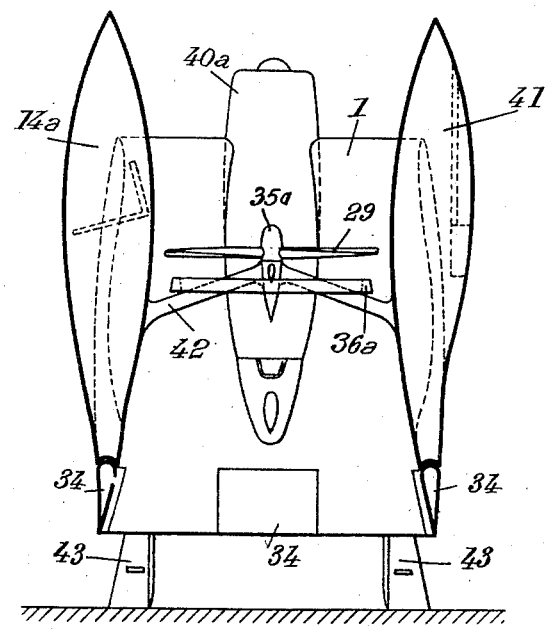
Figures 4 and 5 are an axial sectional view and a front view respectively of a machine made according to another embodiment of the invention.
Figure 5:
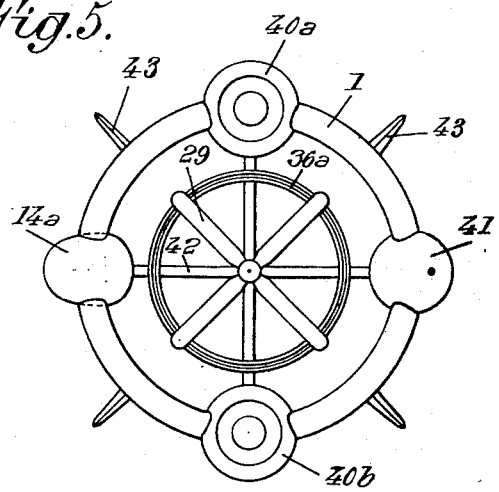

Figs. 4 and 5 show another embodiment of an aircraft according to my invention. This aircraft is an interception fighter. Its power plant includes two turbo-jet engines 40a and 40b mounted directly on the annular wing 1 and a ram-jet the casing of which is constituted by the annular wing 1. Fuel is fed to the inner space of said ram-jet through hollow rotating windmill blades 29 downstream of which is disposed a flame stabilizer 36a. The hub 35a of the set of blades 29 and the flame stabilizer 36a are carried by radial arms 42. The cabin is at 14a and another streamlined hollow structure 41, diametrally opposed thereto, is provided to hold firearms and equipment. Cabin 14a and structure 41 are directly mounted on the annular wing. Radial arms 42 extend from these parts and from the casings of turbo-jets 40a and 40b. On the drawing, cabin 14a and structure 41 are shown of slightly different shapes, but they may be made of identical external shapes.

In this embodiment of my invention, the control means capable of giving the annular wing the positive incidence necessary for level flight consist of flaps 34 disposed along the trailing edge of wing 1. These flaps form at least two pairs, the two flaps of each pair being opposed to each other, at the respective ends of a diameter of the wing, and being controlled so as to be both pivoted simultaneously in the same direction. Thus one of these flaps produces an aerodynamic reaction from the external air stream and the other from the jet stream. Those flaps may be replaced by other means, for example by the same number of spoilers arranged at the same place.

Preferably the power plant has sufficient thrust to enable the machine to make a vertical take-off, that is, the thrust is greater than the weight of the machine.

The trailing edge portion of wing 1 carries rearwardly and outwardly projecting fins 43 upon which the aircraft is supported when it is resting vertically on the ground.

While I have described herein some embodiments of my invention, I wish it to be understood that I do not intend to limit myself thereby except within the scope of the claims hereto or hereinafter appended.

What I claim is:

1. A flying machine including a ram-jet power plant, adapted to exert a thrust along a given line, annular lifting means forming substantially the whole aerodynamic sustaining means of said machine, said annular lifting means being concentric with said line and comprising as the main lift surface a tunnel-shaped wing of substantially annular transverse section and of airfoil shaped longitudinal section, means mounting said power plant with respect to said lifting means, said lifting means being of such shape and dimension as to produce, at a predetermined positive angle of incidence with respect to the direction of travel of the machine in the air and at a speed within the power of the power plant a lift at least equal to the weight of the machine, and movable control surfaces for giving said lifting means a positive incidence of such predetermined angle, said machine having its center of gravity so located with respect to the center of lift as to be capable of maintaining such a positive incidence, the interior of said tunnel-shaped wing forming a wall of the combustion chamber of said power plant, said machine having a ring of airfoil section of greater diameter than the trailing edge portion of said main tunnel-shaped wing and mounted thereon coaxially thereto adjacent the trailing edge thereof, at least one of said movable control surfaces being carried by said ring.

2. A flying machine including a ram-jet power plant adapted to exert a thrust along a given line, annular lifting means forming substantially the whole aerodynamic sustaining means of said machine, said annular lifting means being concentric with said line and comprising as the main lift surface a tunnel-shaped wing of substantially annular transverse section and of airfoil shaped longitudinal section, means mounting said power plant with respect to said lifting means, said lifting means being of such shape and dimension as to produce, at a predetermined positive angle of incidence with respect to the direction of travel of the machine in the air and at a speed within the power of the power plant a lift at least equal to the weight of the machine, and movable control surfaces for giving said lifting means a positive incidence of such predetermined angle, said machine having its center of gravity so located with respect to the center of lift as to be capable of maintaining such a positive incidence, the interior of said tunnel-shaped wing forming a wall of the combustion chamber of said power plant, said machine having a ring of airfoil section of greater diameter than the trailing edge portion of said main tunnel-shaped wing, radial members extending outwardly from said main wing mounting said ring thereon coaxially thereto adjacent the trailing edge thereof, said movable control surfaces being carried by said radial members and said ring.

3. A machine according to claim 2 in which said movable control surfaces comprise spoilers.

References Cited in the file of this patent

UNITED STATES PATENTS

| | | |
|---|---|---|
| 1,440,242 | Porter | Dec. 26, 1922 |
| 1,686,080 | Ford | Oct. 2, 1928 |
| 2,566,319 | Deacon | Sept. 4, 1951 |
| 2,590,009 | Hannum | Mar. 18, 1952 |
| 2,776,622 | Robert | Jan. 8, 1957 |
| 2,787,218 | Anthony | Apr. 2, 1957 |

FOREIGN PATENTS

| | | |
|---|---|---|
| 726,969 | Germany | Oct. 23, 1942 |
| 945,470 | France | Nov. 29, 1948 |